United States Patent [19]

Barber

[11] Patent Number: 4,837,517

[45] Date of Patent: Jun. 6, 1989

[54] SPATIAL FREQUENCY METHOD AND APPARATUS FOR INVESTIGATING EARTH CONDUCTIVITY WITH HIGH VERTICAL RESOLUTION BY INDUCTION TECHNIQUES

[75] Inventor: Thomas D. Barber, Houston, Tex.

[73] Assignee: Schlumberger Technology Corporation, Houston, Tex.

[21] Appl. No.: 73,933

[22] Filed: Jul. 16, 1987

[51] Int. Cl.⁴ .............................................. G01V 3/28
[52] U.S. Cl. ................................................... 324/339
[58] Field of Search ................................. 324/332–346

[56] References Cited

U.S. PATENT DOCUMENTS

| | | |
|---|---|---|
| 2,582,314 | 1/1952 | Doll . |
| 2,582,315 | 1/1952 | Doll . |
| 2,723,375 | 11/1955 | Schuster . |
| 2,725,523 | 11/1955 | Doll . |
| 2,761,103 | 8/1956 | Doll . |
| 2,790,138 | 4/1957 | Poupon . |
| 2,948,846 | 8/1960 | Coufleau . |
| 2,964,698 | 12/1960 | Lehmberg, Jr. . |
| 2,987,668 | 6/1961 | Gondouin . |
| 3,056,917 | 10/1962 | Tanguy . |
| 3,067,382 | 12/1962 | Schuster . |
| 3,067,383 | 12/1962 | Tanguy . |
| 3,090,910 | 5/1963 | Moran . |
| 3,119,061 | 1/1964 | Tanguy . |
| 3,147,429 | 9/1964 | Moran . |
| 3,150,314 | 9/1964 | Tanguy . |
| 3,166,709 | 1/1965 | Doll . |
| 3,179,879 | 4/1965 | Tanguy . |
| 3,226,633 | 12/1965 | Schneider . |
| 3,230,445 | 1/1966 | Sloughter . |
| 3,249,858 | 5/1966 | Gouilloud . |
| 3,327,203 | 6/1967 | Attali . |
| 3,329,889 | 7/1967 | Tanguy . |
| 3,340,464 | 9/1967 | Gouilloud et al. . |
| 3,405,349 | 10/1968 | Moran . |
| 3,414,805 | 12/1968 | Attali . |
| 3,453,530 | 7/1969 | Attali . |
| 3,457,496 | 7/1969 | Schuster . |
| 3,457,497 | 7/1969 | Schuster . |
| 3,457,498 | 7/1969 | Schuster . |
| 3,457,499 | 7/1969 | Schuster . |
| 3,457,500 | 7/1969 | Schuster . |
| 3,496,455 | 2/1970 | Gouilloud . |
| 3,706,025 | 12/1974 | Regat . |
| 4,278,941 | 7/1981 | Freedman .................. 324/339 X |
| 4,360,778 | 11/1982 | Freedman ................... 324/339 |
| 4,467,425 | 8/1984 | Schaefer . |
| 4,471,436 | 9/1984 | Schaefer . |
| 4,472,684 | 9/1984 | Schuster . |
| 4,513,376 | 4/1985 | Thomas . |
| 4,529,938 | 7/1985 | Hagiwara ................... 324/339 |
| 4,626,785 | 12/1986 | Hagiwara ................... 324/339 |
| 4,692,706 | 9/1987 | Mazzagatti et al. ......... 324/338 |

OTHER PUBLICATIONS

Barber, "Introducing to the Phasor Dual Induction Tool", *JPT*, pp. 1699–1706, Sep. 1985.
Barber, "Invasion Profiling with the Phasor Induction Tool", *SPWLA*, pp. 1–14, 1906.
Anderson et al., "Strange Induction Logs—A Catalog of Environmental Effects", *SPWLA*, pp. 1–16, 1987.
Kienitz, et al., "Accurate Logging in Large Boreholes", *SPWLA*, pp. 1–21, 1986.
"Phasor Induction Tool", *Schlumberger*, Jul. 1986, 1–40.

*Primary Examiner*—Reinhard J. Eisenzopf
*Assistant Examiner*—Warren S. Edmonds
*Attorney, Agent, or Firm*—Henry N. Garrana; John H. Bouchard

[57] ABSTRACT

An electrical induction sonde for measuring a characteristic of an earth formation traversed by a borehole having improved vertical resolution and excellent depth of penetration. The sonde has two or more transmitter-receiver spacings preselected to provide at least two separate induction signals received from the formation that, when combined, produce a response function indicative of formation physical properties with no zeros in the spatial frequency response function over the frequency domain of interest.

8 Claims, 4 Drawing Sheets

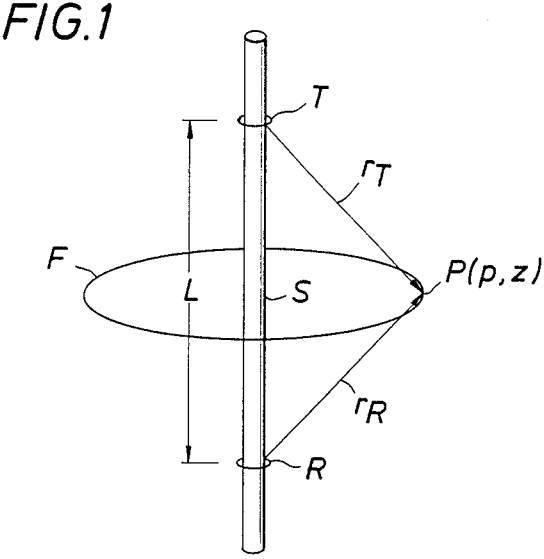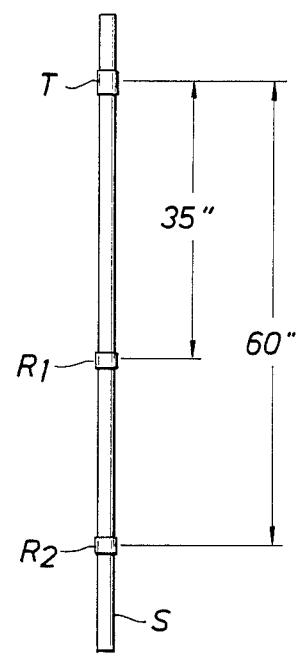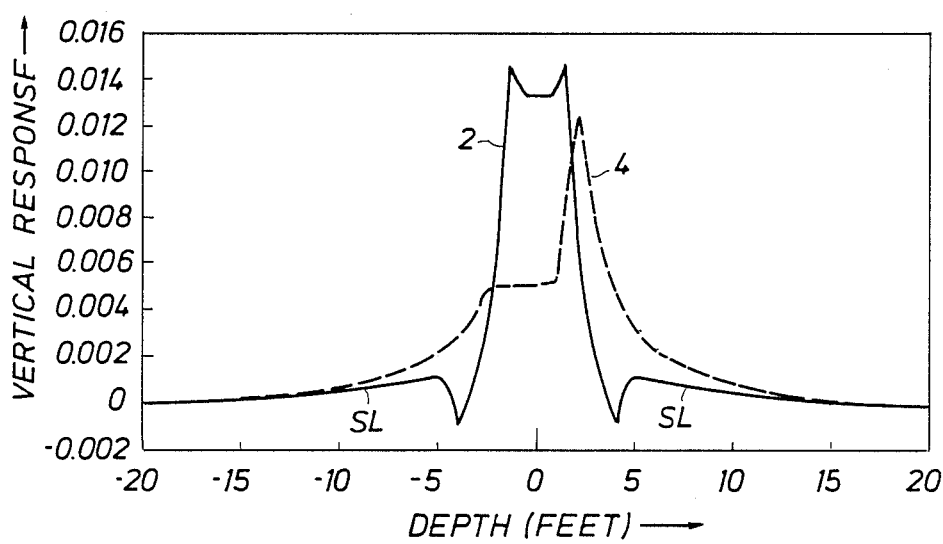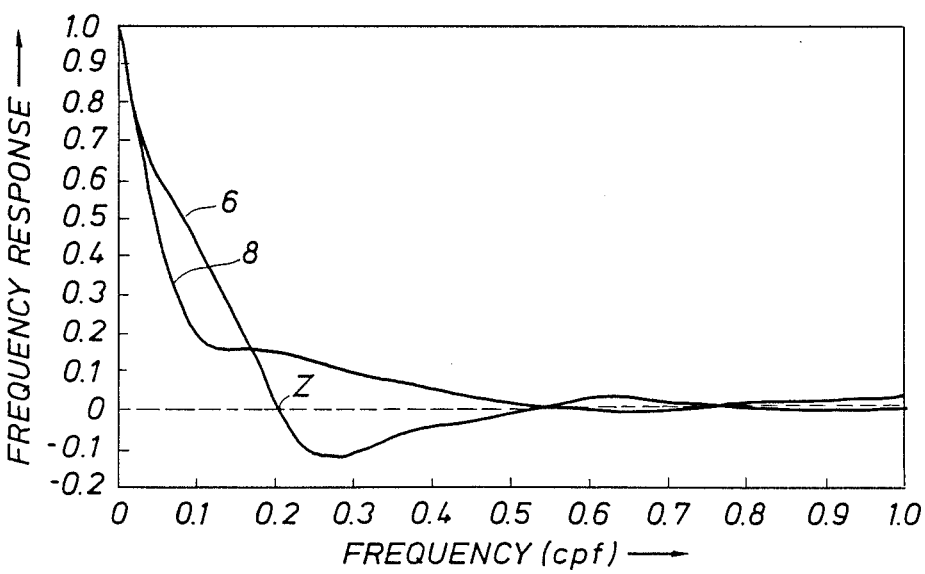

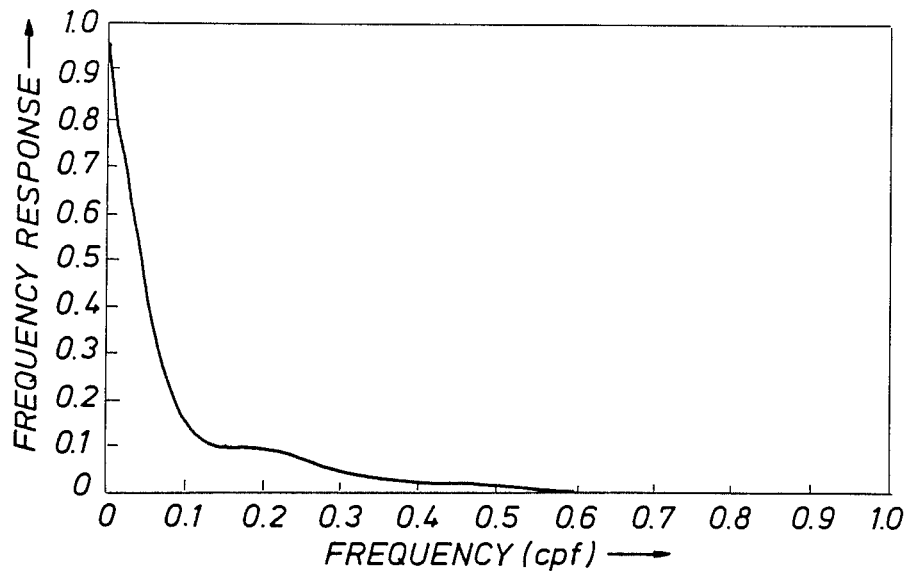
FIG.8
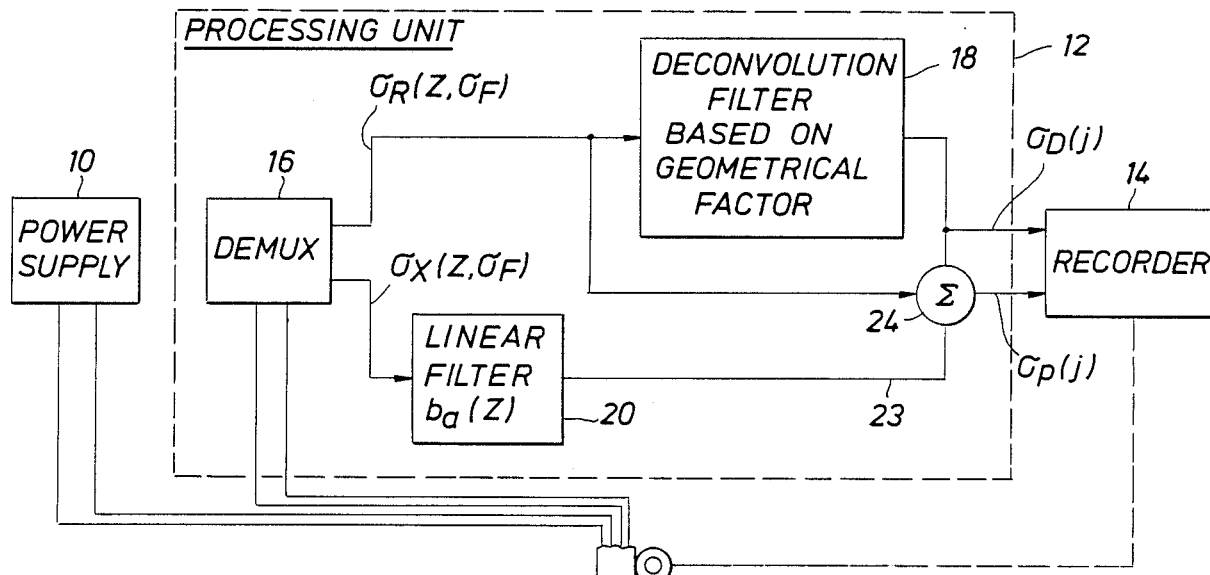
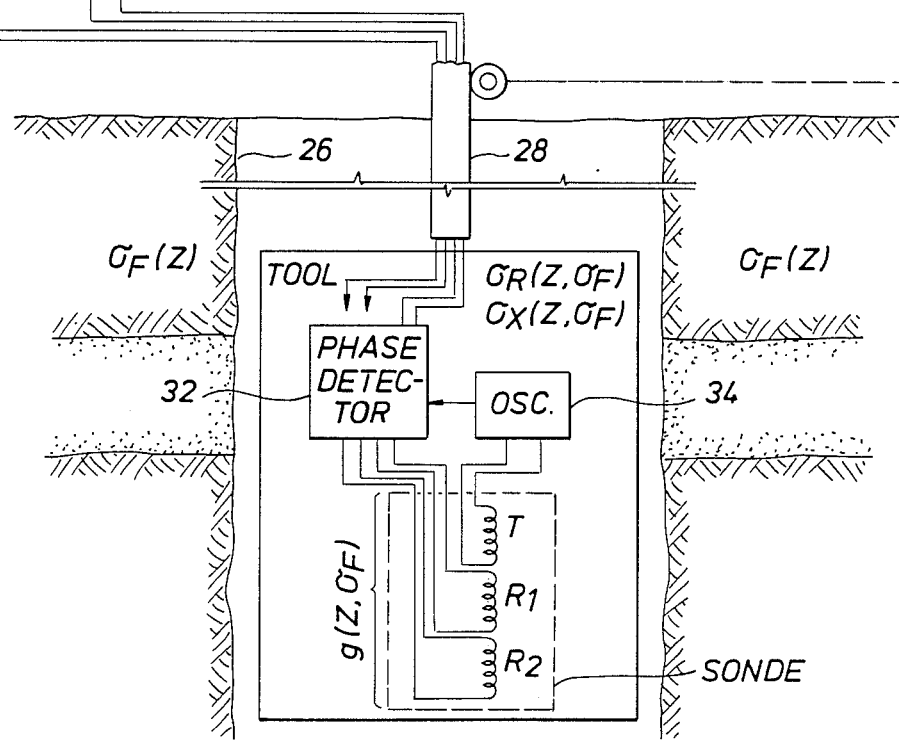
FIG.10

SPATIAL FREQUENCY METHOD AND APPARATUS FOR INVESTIGATING EARTH CONDUCTIVITY WITH HIGH VERTICAL RESOLUTION BY INDUCTION TECHNIQUES

BACKGROUND OF THE INVENTION

This invention relates to electrical induction logging systems for determining the nature and characteristics of the various sub-surface formations penetrated by a borehole in the earth. More particularly, this invention relates to a high resolution array induction sonde that provides better vertical resolution while retaining the level of depth of penetration of prior tools.

It is important to the oil and gas industry to know the nature and characteristics of the various sub-surface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to an AC transmitter signal, and then measuring a phase component signal in a receiver signal generated by the presence of the eddy currents. Variations in the magnitude of the eddy currents in response to variations in formation conductivity are reflected as variations in the receiver signal. Thus in general, the magnitude of a phase component of the receiver signal, that component in-phase with the transmitter signal, is indicative of the conductivity of the formation.

U.S. Pat. Nos. 3,340,464; 3,147,429; 3,179,879; 3,056,917 and 4,472,684 are illustrative of typical prior-art well logging tools which utilize the basic principles of induction logging. In each of the tools disclosed in these patents, a signal generator operates to produce an AC transmitter signal which is applied to a transmitter coil. The current in the transmitter coil induces in the formations a magnetic field, which, in turn, causes eddy currents to flow in the formations. Because of the presence of these formation currents, the magnetic field of the transmitter is coupled into a receiver coil R thereby generating a receiver signal. (Logging tools having "a receiver coil" and "a transmitter coil" each comprising several coils arranged in a predetermined geometrical fashion to obtain a desired response are commonly used. These coil systems are sometimes referred to as "focused" coil systems.) The receiver signal is then generally amplified and applied to one or more phase sensitive detectors (PSDs). Each PSD detects a phase component signal having the same phase as a phase reference signal which is also applied to the detector. The phase reference signal has a predetermined phase relationship to the current in the transmitter coils(s). The output of the PSD(s) may be further processed downhole, or may be sent uphole to surface equipment for processing or display to an operating engineer. Such processing may be accomplished using many well known techniques, including phasor deconvolution processing taught by U.S. Pat. Nos. 4,513,376 issued to T. Barber on Apr. 23, 1985, and 4,471,536 issued to R. Schaefer and T. Barber on Sept. 11, 1984, both incorporated by reference.

Since the earliest patents pertaining to focussed coil systems for induction logging (U.S. Pat. Nos. 2,582,314 and 2,582,315) the art has attempted to reduce the contribution to the tool response made by that part of the formation invaded by the drilling fluid ("invaded zone") and by formations above and below the region of interest. For example, U.S. Pat. No. 3,067,383, issued to D. R. Tanguy on Dec. 4, 1962 and incorporated herein by reference, discloses a sonde (hereinafter referred to as the Tanguy sonde) that has been very widely used in the industry and U.S. Pat. No. 2,790,138 issued to A. Poupon on Apr. 23, 1957 discloses the use of a plurality of electrically independent transmitter-receiver pairs arranged symmetrically about the same center point. The response of that tool is obtained by combining the response of the several electrically independent pairs, these pairs being arranged in such a manner that contributions to the tool response from formation regions lying above or below the outermost coils and from the formation region close to the borehole are reduced. These attempts to increase vertical resolution and achieve greater depth of formation penetration have not been entirely successful.

Until recently, strong deconvolution methods for induction sondes have failed in practice, because the response of an induction sonde is a nonlinear function of the formation conductivity. Any deconvolution method that does not correct for this nonlinearity will fail when applied to real log data. On the other hand, attempts to produce a strongly focused induction array have also had problems. Unlike radar antennas, an induction sonde can be 'focussed' in the array only by adding coil pairs that subtract out signal from where it is not wanted, leading to very low sensitivity. Another problem with strong focussing is the length necessary to produce a narrow response lobe.

With the advent of the phasor deconvolution processing methods, noted previously, with its skin effect correction, deconvolving the nonlinear induction response function became possible. The application of phasor deconvolution to prior tools has produced logs free of shoulder effect, but with no increase in vertical resolution. The resolution problems lie therefore, in the response function of the prior tools themselves. With the present state of the art in signal processing, the only solution to these problems is an array whose response function contains sufficient high spatial frequency information to allow successful sharpening with a deconvolution filter. The present invention provides such an induction array tool.

It is therefore an object of the invention to provide a novel induction tool having a focussed array capable of better vertical resolution and greater radial depth of penetration than prior tools.

Another object is to provide a novel focussed array induction tool that minimizes the tool response from borehole formation regions lying above or below the outermost coils and from the region close to the borehole.

A further object is to provide a novel dual induction or multiple induction tool having complementary arrays that provide various radial depths of penetration.

Other and further objects will be explained hereinafter and are more particularly delineated in the appended claims.

In summary, however, from one of its broad aspects, the invention contemplates an induction sonde for measuring a characteristic of a formation, having at least one transmitter and at least one receiver such that two or more preselected transmitter-receiver spacings are created to produce a sonde having a spatial frequency response function without zeros in the frequency domain of interest. Preferred details and structures are hereinafter more particularly described.

The invention will now be described with reference to the accompanying drawings in which:

FIG. 1 shows schematic representation of an ideal 2-coil sonde with cylindrical coordinates used to reference an arbitrary point P in the formation;

FIG. 2 shows an illustration of a sonde of the present invention;

FIG. 3 shows the vertical response functions of a prior tool and the sonde of FIG. 2;

FIG. 4 shows the spatial frequency response functions of a prior tool and the sonde of FIG. 2;

FIG. 8 shows the spatial frequency response function of the sonde of FIG. 2 after symmetrization;

FIG. 10 is a schematic block diagram of an induction logging system of the present invention.

Figure 5:
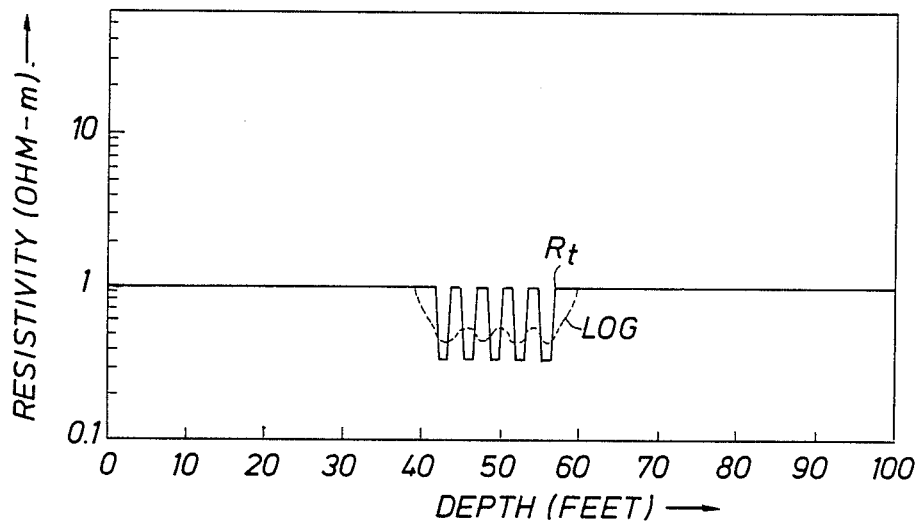
FIG. 5 shows a phasor log for a prior tool in a series of thin beds.

Referring now to FIG. 1, a transmitter coil T and a receiver coil R are mounted on a support member S having a transmitter-receiver spacing L for investigating a formation F. The transmitter current induces eddy currents in the formation one loop of which is shown diagrammatically as a circle at a point P having cylindrical coordinates $P(\rho,z)$ with a distance between the point P and transmitter or receiver being shown as $r_T$ or $r_R$ respectively.

The response of the induction tool to various parts of the formation is well known. Specifically, the induction signal received by the receiver coil(s) from the formation is simply the volume integral of all of the formation current density induced by the electromagnetic induction signal being transmitted into the formation by the transmitter(s). For a two-coil array at the zero conductivity limit this volume integral is easily interpreted.

With the coils arranged as shown in FIG. 1, with the formation having uniform conductivity, the total voltage in the receiver coil induced by the entire formation conductivity is in the form of convolution or mapping integral:

$$V_R = K\sigma \int_{-\infty}^{\infty} \int_{0}^{\infty} \frac{\rho^2}{r_R^3 r_T^3} d\rho dz \quad (1)$$

where the integrand:

$$g(\rho,z) = \frac{\rho^3}{r_R^3 r_T^3} \quad (2)$$

called the geometrical factor or response function, describes the contribution to the total receiver coil voltage from the point P in the formation. The instrument constant K takes into account the size of the coils, the number of turns and spacing as is well known. For an array with more than two coils, the total response is a superposition of the possible individual coil-pair response.

Integrating the response function $g(\rho,z)$ with respect to $\rho$ gives the response of the array to the bedding layers of the earth formation, known as the vertical response function or geometrical factor $g(z)$. This will be further discussed subsequently with respect to FIG. 5.

Referring now to FIG. 2 thee is shown schematically a sonde of the present invention having a single transmitter T and two receivers $R_1$ and $R_2$ with two transmitter-receiver spacings, 35 inches and 60 inches respectively, mounted on a support member S. For simplicity, additional coils, such as bucking coils have not been shown but may be used as is well known in the art. Other structures are contemplated including more than two receivers, two or more transmitters with one receiver and/or more than one transmitter with multiple receivers as long as the sonde has two or more preselected transmitter-receiver spacings. Additionally, the sonde of FIG. 2 shows a non symmetric sonde whereas the preferred use of the invention would include a symmetric sonde as described further in connection with FIG. 7. For purposes of comparison however, the sonde of FIG. 2 will be shown as compared to the prior Tanguy sonde.

The nature of an ideal processing method (hereinafter referring to phasor processing) used to filter the receiver signals to produce a measurement of a formation characteristic is well disclosed in U.S. Pat. No. 4,513,376. However, limits produced by the prior sonde designs, such as the Tanguy sonde, also limited the log that could be produced when using the phasor-processing. Such limitations include negative or skewed correlation between the resistivity log and the actual formation resistivity, especially in thin beds. Providing a sonde such as the present sonde with a response signal more well suited to the phasor processing limits the anticorrelation of the Tanguy sonde in thin beds and therefore provides a sonde with better vertical resolution. Comparison of resistivity logs produced by the Tanguy and instant (FIG. 2) sonde can be seen in FIGS. 5 and 6.

To provide the logs of FIGS. 5 and 6 the phasor processing is implemented generally by a processing unit 12 as shown in FIG. 10, discussed later. The phasor processing is used on the voltage measurements obtained by the receivers of the induction logging tool or sonde. These voltage measurements are representative of the conductivity of the formation based on the well known geometrical factor theory. The induced current $J_F(\rho,z)$ induced at point P in the formation (see FIG. 1) is the result of a transmitter current J of the form $I_o e^{i\omega t}$. This current induces an eddy current distribution in the surrounding formation which is related to the transmitter position and the formation conductivity distribution. The current flowing in the formation is computed by solving Maxwell's Equations for the appropriate boundary conditions.

This solution is described in general terms by the retarded potential solution which implies that the field giving rise to an eddy current at a given point in the formation is dependent on the magnitude of the current flowing in other parts of the formation. Alternatively, the field can be thought of as propagating through a dispersive medium. All interactive or propagation effects are described by the retarded potential solution, so, once the current distribution in the formation is computed, the voltage induced in the receiver coil by the formation currents can be computed by applying the Biot-Savart law and integrating over the volume containing eddy currents. Thus, $$V_M(Z) \propto \frac{d\bar{B}}{dt} R,  \quad (3)$$

where $\bar{B}_R$ is the magnetic field at the receiver coil R, and is given by the following equation:

$$\bar{B}_R = \frac{\mu_0}{4\pi} \int_V \frac{\bar{J}_F \times \bar{r}_R}{r_R^3} dV. \quad (4)$$

This leads to a general solution of the receiver signal in terms of the formation conductivity distribution $\sigma_F(\rho,z,\phi)$ (using cylindrical coordinates $\rho,z,\phi$ to represent the formation coordinates)

$$\sigma_M(Z) = \int_0^{2\pi} \int_{-\infty}^{\infty} \int_0^{\infty} g(\rho - \rho', z - z', \phi - \phi', \sigma_F)\sigma_F(\rho',z',\phi')d\rho'dz'd\phi'. \quad (5)$$

Here, the function $g(\rho,z,\phi,\sigma_F)$ represents both the geometrical parts of the coupling and the propagation parts. $\sigma_M(z)$ is the receiver signal in units of conductivity at the position $\rho=0,z$. The function $g(\rho,z,\phi,\sigma_F)$ maps the formation conductivity $\sigma_F(z)$ into the measured signal $\sigma_M(z)$ In the homogeneous medium, $g(\rho,z,\phi,\sigma_F)$ is given by $$g_{HOM} = \frac{L}{4} \frac{\rho^3}{r_R^3 r_T^3} [(1 - ikr_T)e^{ikr_T} + (1 - ikr_R)e^{ikr_R}], \quad (6)$$

where L is the coil spacing,
$k^2 = i\omega\mu\sigma_F$ is the propagation constant,
$r_T$ is the vector distance from the transmitter coil to the formation element $(\rho,z)$, and
$r_R$ is the vector distance from the receiver coil to the formation element $(\rho,z)$ (the $\phi$ dependence disappearing due to the cylindrical symmetry).

Equation 5 does not represent a proper convolution, for the function $g(\rho,z,\phi,\sigma_F)$ is not linear. That is, $$\int_V g\alpha\sigma_F dV \neq \alpha \int_V g\sigma_F dV. \quad (7)$$

However, the function g will be referred to a the induction sonde response function because it does describe the mapping of the formation conductivity distribution into the received signal at the point $\rho=0$, z. The function g is, obviously, different at each point along the borehole.

The following derivation considers only cylindrically symmetric formation geometries so the integration over $\phi$ disappears. Since the measured signal is constrained by the borehole to be a function of z only, integration over $\rho$ obtains the vertical spatial sonde response function g given as follows:

$$g(z,\sigma_F) = \int_0^{\infty} g(\rho,z,\sigma_F)d\rho. \quad (8)$$

The mapping function $g(z, \sigma_F)$ is, like the general function in Equation 5, a function of $\sigma_F(z)$ and is non-linear with linear changes in $\sigma_F(z)$. The following mapping operation $$\sigma_M = \int_{-\infty}^{\infty} g(z - z', \sigma_F)\sigma_F(z')dz' \quad (9)$$

is also not a proper convolution so the concept of a linear deconvolution is not applicable.

However, in the limit of low conductivity, Equation 6 reduces to $$g_{GF} = \frac{L}{2} \frac{\rho^3}{r_R^3 r_T^3}, \quad (10)$$

Where $g_{GF}(z)$ is the geometrical factor of the induction sonde and is constant over all formation conductivities. The function $g_{GF}(z)$ is not accurate description of the induction response at higher conductivities, but the present invention uses $g_{GF}(z)$ as the basis of the development of a deconvolution method.

The convolution of $g_{GF}(z)$ with the formation conductivity produces a "measurement," $\sigma_{GF}(z)$, given by:

$$\sigma_{GF} = \int_{-\infty}^{\infty} g_{GF}(z - z')\sigma_F(z')dz', \quad (11)$$

This is what would be measured by an induction sonde if there were no skin effect, and represents a proper convolution. Equation 10, when integrated over $\rho$, gives the vertical geometrical factor:

$$g_{GF}(z) = \begin{cases} \frac{1}{2L} & |z| < \frac{L}{2} \\ \frac{1}{8z^2} & |z| > \frac{L}{2} \end{cases}. \quad (12)$$

Since the measured signal $\sigma_M(z)$ given by equation (9) is a complex quantity, $\sigma_M(z) = \sigma_R(z) + i\sigma_X(z)$, and the sonde response function is the weighting function which describes the contribution of the conductivity of each element of the formation to the measured conductivity referred to a given depth, $g(z)$ must also be complex.

Thus, $$g(z,\sigma_F) = g_R(z,\sigma_F) + ig_X(z,\sigma_F), \quad (13)$$

where $g_R(z, \sigma_F)$ is the real component of the sonde response function and is that response function which transforms the inphase R component measurements and $g_X(z, \sigma_F)$ is the imaginary component of the sonde response function which transforms the quadrature phase X components. While $g(z, \sigma_F)$ (and its components, $g_R(z, \sigma_F)$ and $g_X(z, \sigma_F)$) is both a function of depth (z) and conductivity ($\sigma_F$), hereinafter the discussion will be in reference to g(z) as a function only of depth, unless otherwise stated, while recognizing that g(z) changes as the conductivity ($\sigma_F$) of the formation under investigation changes. Therefore g(z) will be referred to as the vertical response function, being a function of vertical depth. Where $\sigma_F$ is approximately zero, g(z, $\sigma_F$) is real and is defined to be $G_{GF}(z)$, the geometrical factor of the induction sonde, and $\sigma_M = \sigma_R$.

FIG. 3 shows the vertical response function 2 for the Tanguy sonde compared to the vertical response function 4 for the sonde of FIG. 2. The main lobe of function 2 is approximately seven feet which corresponds to the minimum formation bed thickness that can be fully resolved. The side lobes (SL) are responsible for what is commonly called "shoulder effect". If, for example, the formation beds adjacent to a bed of interest are more conductive than the bed of interest, then these side lobes will introduce error into the log, and the resistivity as measured by the induction array will be too low. This can be corrected in phasor processing of induction logs to produce a response function g(z) for the Tanguy sonde with no side lobes. However, the phasor processing will not produce resolution in beds thinner than seven feet for the Tanguy sonde.

The reasons for not enhancing the vertical resolution (for example by providing resolution in thinner than seven foot beds) is due to the spatial frequency response of the Tanguy sonde. The spatial frequency response function G(k) is found by taking the Fourier transform of the vertical response function g(z).

FIG. 4 shows the spatial frequency response function 6 of the Tanguy sonde and the spatial frequency response function 8 of the sonde of FIG. 2. As the frequency nears 1.0, which is the sampling frequency, less information is useful. Therefore, generally, the frequencies between 0.0 and 0.5 are the frequencies of interest for the two sondes. All future references, unless stated otherwise, will therefore only concern the frequencies of interest. (Obviously, such frequencies will vary depending on the sonde and formation to be tested.) Of specific note is the spatial frequency at which the spatial frequency response 6 for the Tanguy sonde becomes zero (point z) at slightly above 0.2 cpf in comparison to the non-zero nature of the spatial frequency response 8 of the FIG. 2 sonde within the frequencies of interest (0.0–0.5). The point z where the spatial frequency response G(k)=0 represents formation periodicities that will not be apparent on the induction log, as discussed below. Formation periodicities that fall in the region where the spatial frequency response G(k) is negative means that the logs will anti-correlate with the log as seen in FIG. 5.

More specifically, and referring again to FIG. 3, the vertical response function $g_R(z)$ for the Tanguy sonde can be described as having a main lobe spanning a length of the borehole and symmetrical non-zero sidelobes (SL) which extend outwardly from the main lobe with tails that decrease in amplitude with increasing distance from the measure point. As the conductivity increases, these non-zero sidelobes increasingly become more negative with the main lobe decreasing in amplitude. These large negative lobes cause "horns" to appear on the log as the sonde passes from a region of high conductivity to one of low conductivity, and vice versa.

The sonde response function for an induction logging tool would ideally be a delta function $\delta(z-z')$ that maps the conductivity of an infinitesimally thin sheet of formation into the measured value of $\sigma_M(z)$ at each measurement depth. The sonde response function for any realizable sonde, however, is far from ideal, and each measurement will include the contributions from a volume of formation many feet thick.

Although the sonde response function does not describe an infinitesimally thin sheet of formation, but rather includes contributions from the conductivity of formations several feet in thickness, there could possibly exist an operator h(z) which would map the sonde response function g(z) into the ideal delta function $\delta(z-z')$. Thus, an expression for $\delta(z-z')$ could be written as:

$$\delta(z) = \int_{-\infty}^{\infty} h(z-z')g_{GF}(z')dz'. \qquad (14)$$

Equation 14 can be rewritten in the spatial frequency domain $\omega$ by performing a Fourier transform of both sides of equation 14, yielding:

$$\Delta(\omega) = H(\omega)G_{GF}(\omega) \qquad (15)$$

Assuming that the conductivity if constant radially (noninvaded beds), in a homogeneous medium, the apparent conductivity will be given by:

$$\sigma_M(z) = \int_{-\infty}^{\infty} g_{GF}(z-z')\sigma_F(z-z')dz', \qquad (16)$$

where z' is the axial distance from the center of the sonde and $\sigma_F(z-z')$ is the true formation conductivity. Equation 16 is recognized as being of the form of the convolution integral of a linear time-invariant filter.

The Fourier transform of Equation 16 may be taken:

$$\Sigma_M(\omega) = G_{GF}(\omega)\Sigma_F(\omega) \qquad (17)$$

where the spatial frequency, $\omega$, equals the reciprocal of distance. The article of C. F. George, et al., appearing in the February 1964 issue of Geophysics, entitled "Application of Inverse Filters to Induction Log Analysis," shows applying Fourier transforms to equations which characterize induction logging, and obtaining inverse filters to improve data processing of induction logs.

From Equation 15, if the ideal system transfer function $\Delta(\omega)$ is substituted for $G_{GF}(\omega)$ of equation 17, the apparent conductivity $\sigma_M(\omega)$ should equal the transformed true conductivity $\sigma_F(\omega)$. Thus, equation 17 becomes:

$$\Sigma_M(\omega) = H(\omega)G_{GF}(\omega)\Sigma_F(\omega) \qquad (18)$$

Referring to Equation 18, if H($\omega$) is equal to the reciprocal of $G_{GF}(\omega)$, the measured conductivity, $\sigma_{Ml}(\omega)$, will equal the formation conductivity $\sigma_F(\omega)$. FIG. 4 shows the Fourier transform of $g_{GF}(z)$ which is the spatial frequency response function 6 for the typical induction logging sonde (Tanguy). The problem with defining H($\omega$) as equal to the reciprocal of $G_{GF}(\omega)$ is that $G_{GF}(\omega)$ vanishes at certain values of $\omega$, leaving H($\omega$) indeterminate. Therefore the specific values $\omega$ for which $G_{GF}(\omega)=0$ are sometimes referred to in the art as "blind" frequencies.

Figure 6:
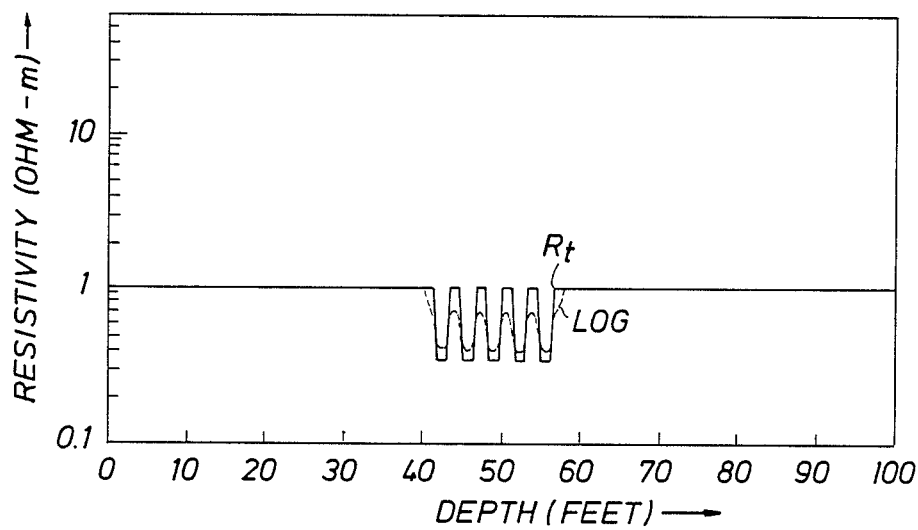
FIG. 6 shows a phasor log, similar to FIG. 5 for the sonde of FIG. 2.

FIG. 5 shows a phasor log for the Tanguy sonde (dotted line) in a series of thin beds having resistivity $R_t$ (solid line) with each layer 21 inches thick. This corresponds to a spatial frequency of approximately 0.3 cpf, well within the region of FIG. 4 where the spatial frequency response $G(\omega)$ of the Tanguy sonde is negative. The anti-correlation is clearly apparent as the phasor log troughs where the formation resistivity peaks, and vice versa.

The blind frequencies present particular difficulties when trying to enhance the vertical resolution of the induction tool. As previously noted, a standard method for computing an inverse filter for $g(z)$ is to find a function $H(\omega)$ such that, for all values of $\omega$, $H(\omega)g(\omega)=1$. The spatial domain filter $h(z)$ is found by computing the inverse Fourier transform $h(z)$ of $H(\omega)$ by the Remez method. However, if for some value of $\omega$ $G(\omega)$ is zero (i.e. if the spatial frequency response function is zero), then for that value of $\omega$ $H(\omega)$ must be infinite. Although there are techniques for handling zeros in spatial frequency response functions, these methods work poorly over the large dynamic range of earth resistivity data. Therefore, practical filters either cut all response above the first zero, or pass the high frequency information unaltered.

In comparison, the tool of FIG. 2 provides a very usable vertical response function 4 as seen in FIG. 3. This vertical response function 4 is simply the combination of the induction signals received by the receivers $R_1$ and $R_2$ (since the receivers $R_1$ and $R_2$ are in series) due to the induction signal transmitted from the transmitter T into the formation. Converting the vertical response function 4 to the spatial frequency response function 8 provides for no zeros in the spatial frequency response function over the frequencies of interest. Such non-zero quality provides for a correlating and accurate phasor log as seen in FIG. 6, with better vertical resolution (since it can properly log the 21 inch beds, having resistivity $R_t$, shown by the solid line) than the Tanguy tool shown in FIG. 5.

In more general terms the induction tool is a deep-reading tool because of the slow fall-off of the EM field with distance from the tool. In order to build a hard wired array which has very little sensitivity to the borehole, or which has very small side-lobes, it is necessary to cancel fields from distant parts of the formation. This necessitates many coil pairs spread out over a long array, and the resultant sensitivity to formation conductivity is very low. In addition, the coil-pair set contains a wide range of spacings from the very short to conductivity-dependence (skin effect) and eccentricity with respect to the borehole are dependent on the length of the coil spacings, these effects will be very different on each different coil-pair spacing. The carefully tailored response of the hard-wired array will fall apart with environmental changes and a linear deconvolution filter could not handle these changes.

Turning now to FIG. 10, a block diagram illustration of an induction logging system of the present invention which implements phasor processing is shown. An induction logging tool 30 is shown suspended in a borehole 26 by a wireline cable 28. The induction tool 30 is powered by power supply 10 and includes a sonde (for purposes of illustration, a simple threecoil sonde is shown) having a sonde response function $g(z, \sigma_F)$ which maps the formation conductivity $\sigma_F(z)$ into the log measurements. Tool 30 also includes a phase sensitive detector 32 which responds to signals form the transmitter oscillator 34 and the received signal from receivers $R_1$ and $R_2$ to generate the in-phase, $\sigma_R(z, \sigma_F)$, and quadrature-phase, $\sigma_X(z, \sigma_F)$, components for each log measurement.

A processing unit 12, which may be a general purpose programmed computer, for processing the induction measurements obtained by tool 30 is shown. A demux 16 separates the two components of each log measurement received from tool 30. The in-phase component is applied to deconvolution filter means 18 and provisionally to summation means 24. The quadrature-phase component may be applied to linear filter means 20, as described in U.S. Pat. No. 4,513,376. Deconvolution filter means 18 implements a filter response function $h(z)$ based on the geometrical factor response function $g_{GF}(z)$.

The output of filter 18 is a deconvolved conductivity measurement $\sigma_D(j)$ and represents a processed measurement. The output from filter 18 is applied to summation means 24, and to recorder 14 for possible recording as a processed log. Provisionally applied to summation means 24 is the in-phase component measurements from demux 16. When used in conjunction with the phasor processing of the quadrature-phase component $\sigma_P(j)$, an improved induction log may be obtained ether by summing $\sigma_P(j)$ with $\sigma_D(j)$ or with $\sigma_R(z, \sigma_F)$ directly.

Figure 7:
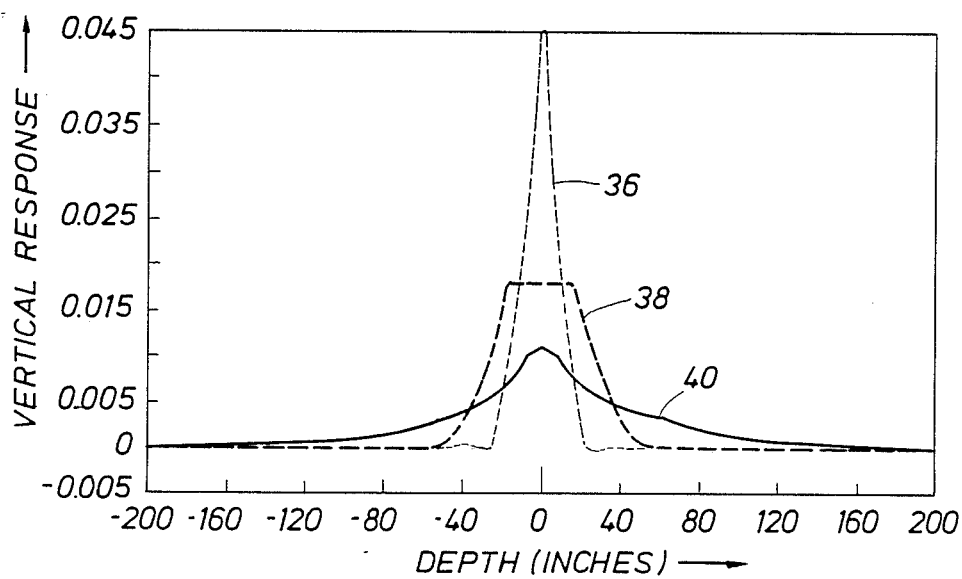
FIG. 7 shows the unprocessed vertical response and the phasor response of the sonde of FIG. 2 and the phasor response of a prior tool.

More specifically, and with reference to FIG. 11, the deconvolution filter means (shown as 18 in FIG. 10) would be, for a symmetric sonde with the transmitter-receiver spacings of the FIG. 2 sonde (having a vertical response function 36 shown and discussed in detail with reference to FIGS. 7 and 8):

$$\sigma_D(j) = \sum_{n=-N}^{N} h(n-j)\sigma_a(h). \tag{19}$$

Figure 11:
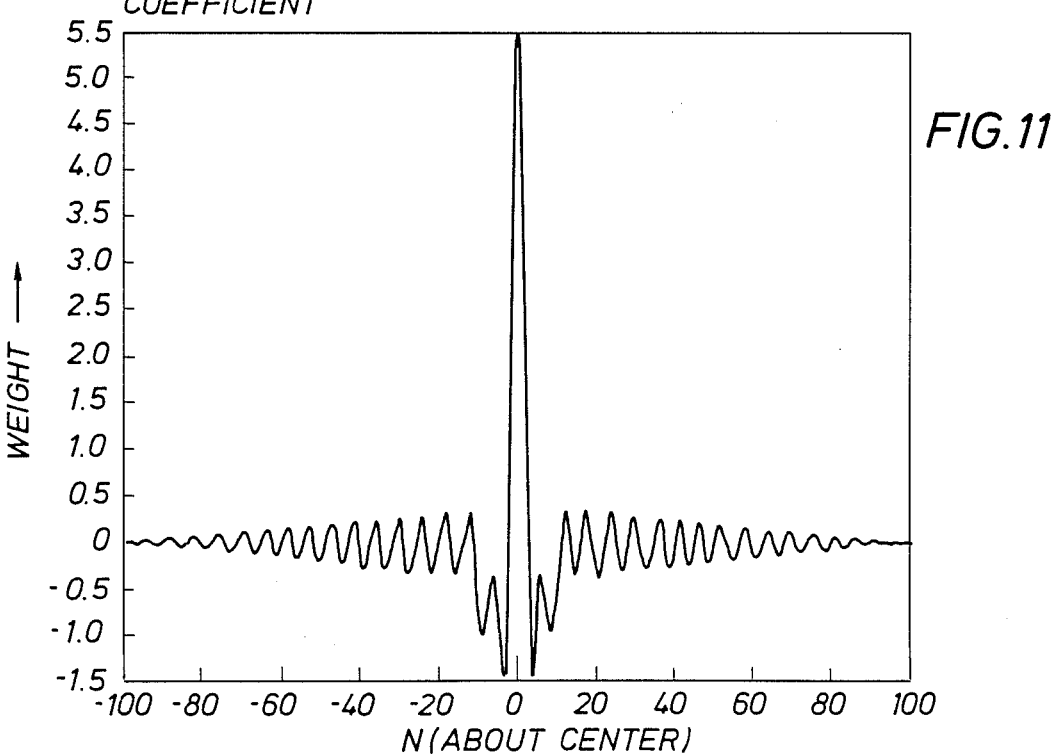
FIG. 11 shows a deconvolution filter for a symmetric sonde having the spacings of FIG. 2.

This deconvolution filter is shown graphically as a weighting curve in FIG. 11. The saw-tooth nature of the weighting curve follows from the effect of the Fourier transform. More complex filters, such as the Kaiser window functions, may be used but are not necessary.

The main advantage of the deconvolution principle is that it can combine measurements made over a very long interval into a single measurement. Since the induction tool "looks" over such a long distance, it follows that measurements should be combined over a similar distance to obtain the best response. For instance, in the filter used in phasor processing, measurements over a total depth of 100 feet are combined to obtain the conductivity at a single borehole depth. Changes in the tool response with conductivity or other environmental effects can be handled by various mechanisms, such as the quadrature signal measurement of phasor processing or by using several filters governed by the strength of the effects.

The first application of phasor processing was to the Tanguy sonde to remove its sensitivity to adjacent conductive beds (shoulder effect). This was the first commercial realization of the deconvolution principle. However, since the phasor method depends on an inverse filter for its operation, the blind frequency problem makes the enhancement of the vertical resolution difficult.

Since the bottleneck in producing an induction response with high resolution through deconvolution is the blind frequency problem, the problems could be solved with an array designed without blind frequencies. What is needed is an array with adequate depth of investigation combined with no zeroes in the spatial frequency response function $G(\omega)$. The simple three-coil sonde with a single transmitter and two receivers as shown in FIG. 2 is such a sonde. If the spacing is chosen so that the investigation depth is the same as that of the Tanguy sonde a more effective tool results. A long spacing of 60 inches provides such depth of investigation.

There is, however, more to induction response than vertical resolution and radial depth of investigation. If the near-field response of the sonde is very asymmetrical about the center of the array, as is the case of the sonde of FIG. 2, that array will have a strong response to irregularities in the borehole. This sensitivity to borehole irregularities is called cave effect.

Methods exist for curing this cave effect phenomenon by making the array symmetric without changing its depth of investigation. Such methods include one shown in previously noted U.S. Pat. No. 4,472,684 issued to Schuster. This method involves synthesizing a response from two identical arrays arranged to be mirror images of each other. Each array is measured separately, either by time or frequency multiplexing. The two measurements, when added, form a symmetric response. If the arrays are positioned so that the positive near-borehole peak of one corresponds to the location of the negative peak of the other, the peaks will cancel and the resultant response will have good cave effect. The positioning can be done mechanically by overlaying the arrays, or can be done virtually, by shifting the measured data so that the measurements coincide. The vertical response function $g(z)$ of the combination is shown in FIG. 7 as line 36 superimposed over the deconvolved or phasor response of the Tanguy sonde 38 and the raw data 40 of the sonde of FIG. 2. These are the results of applying a deconvolution filter designed to have a cut-off frequency of 0.5 cpf to the vertical response $g(z)$ compared with $g(z)$ for the raw response and to the Tanguy sonde phasor response. The spatial frequency response $G(z)$ of the symmetrized sonde of FIG. 2 is shown in FIG. 8. Note again that there are no zeros in the frequency domain of interest (0.0-0.5).

Figure 9:
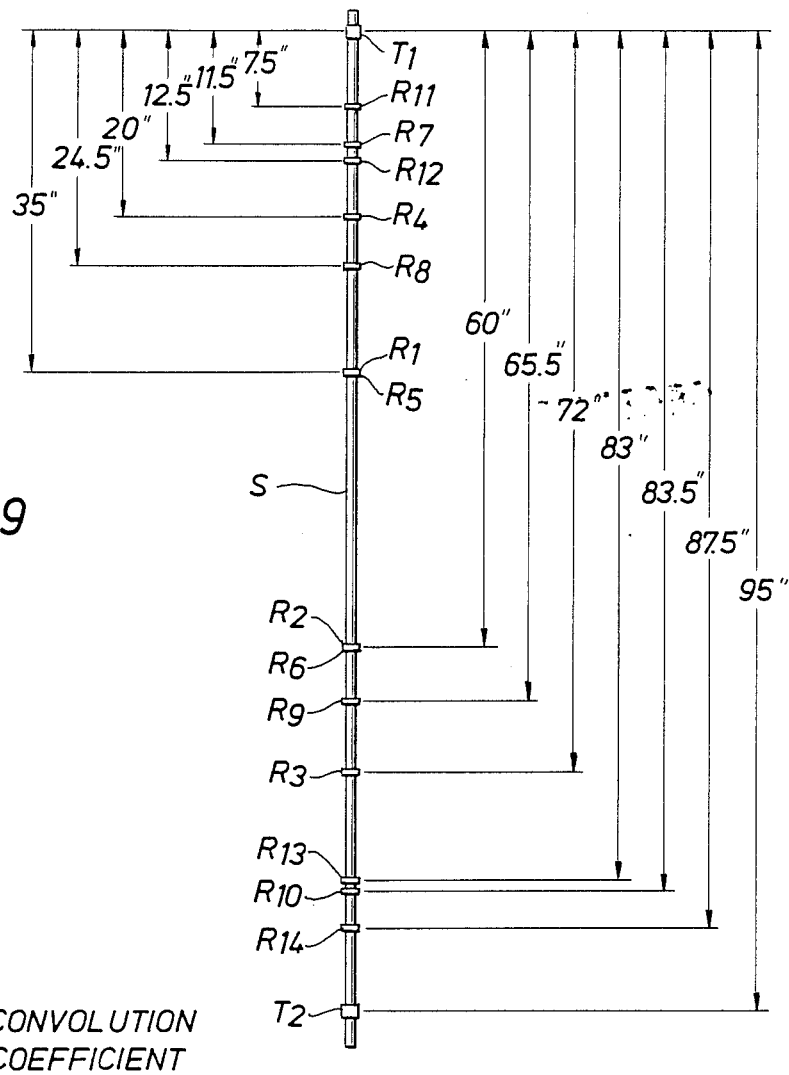
FIG. 9 shows another sonde of the present invention including multiple induction arrays for various depths of formation investigation.

The principles outlined above can be used to build a dual induction or multiple induction tool with each distinct receiver array having its receivers connected in series. One such design is shown in FIG. 9. A basic array with one transmitter $T_1$ spaced away from three receivers $R_1$-$R_3$ is arranged with a second mechanically overlapped array (provided by second transmitter $T_2$ and receivers $R_4$-$R_6$) for the deep induction investigation, while a pair of three-coil arrays ($T_1$, $R_7$-$R_8$ and $T_2$, $R_9$-$R_{10}$) form a symmetrized pair of medium-depth arrays. These two are not mechanically overlapped, for they share the transmitter coils with the deep arrays. The measurements from the medium arrays are depth-shifted so they overlay in the proper manner. A third pair of arrays ($T_1$, $R_{11}R_{12}$ and $T_2$, $R_{13}$-$R_{14}$) provides very shallow measurements for cave correction. These measurements are weighted in with the other arrays to give the best cave response depending on tool position in the borehole. Additionally, the transmitters $T_1$ and $T_2$ may be either simultaneously excited at different frequencies or alternately excited at the same or different frequencies.

The final deep and medium measurements contain contributions from all three arrays, with weights adjusted to give the desired depth of investigation and borehole response, similar in principle to the methods of radial focussing taught by Doll. The sum of the weights must be 1. An example of weights are as follows, given the basic measurements S (shallow), M (medium), and D (deep):

Final deep = $-0.2$ S $-0.1$ M $+1.3$ D

Final medium = $=0.3$ S $+1.5$ M $-0.2$ D

As a note, single blocks are used to represent transmitter T and receiver R placements on the support member S. As two or more receivers R may be placed in the same location, having the same transmitter-receiver spacing, but having other differences (such as number and direction of coil windings) separate designations have been used, such as $R_1/R_5$ and $R_2/R_6$. The induction tool or sonde shown in FIG. 9 therefore provides a multiple induction sonde with various depths of investigation each having excellent vertical resolution and no zeros in the spatial frequency response function.

Further modifications will also occur to those skilled in the art, and such are considered to fall within the spirit and scope of the invention as defined in the appended claims.

I claim:

1. An induction sonde for measuring a characteristic of an earth formation traversed by a borehole comprising:
    a support member;
    transmitter means secured to the support member for transmitting an electromagnetic induction signal into said formation about the sonde; and
    receiver means secured to the support member a preselected distance from the transmitter means for receiving induction signals from the formation thereby determining the vertical response as a function of depth, the preselected distance being selected to provide a sonde with no zeros in the spatial frequency response in the frequency range of interest, said spatial frequency response being the Fourier transform of said vertical response.

2. The induction sonde of claim 1 in which said preselected distance comprises at least two preselected transmitter-receiver spacings.

3. The induction sonde of claim 1 in which the transmitter means comprises one transmitter and the receiver means comprises two receivers.

4. The induction sonde of claim 3 in which the distance from the transmitter to the first receiver is 60 inches and the distance from the transmitter to the second receiver is 35 inches.

5. The induction sonde of claim 1 in which the receiver means includes a plurality of receivers for receiving induction signals from a plurality of depths of investigation in the formation.

6. The induction sonde of claim 1 in which the transmitter means and receiver means are symmetric.

7. The induction sonde of claim 8 in which the receiver means includes overlapped receiver arrays.

8. A method for determining a characteristic of an earth formation traversed by a borehole comprising the steps of:
    transmitting an electromagnetic induction signal into said formation;
    receiving induction signals form said formation thereby determining the vertical response of said formation;

performing a Fourier transform of said vertical response thereby producing a spatial frequency response; and selecting a physical spacing of the transmitter and receiver elements transmitting and receiving said induction signals such that said Fourier transform of said vertical response produces a spatial frequency response having no zeros in the frequency range of interest.

* * * * *